(12) United States Patent
Kim et al.

(10) Patent No.: US 6,396,682 B1
(45) Date of Patent: May 28, 2002

(54) ELECTRIC ENERGY STORAGE DEVICE AND METHOD FOR MANUFACTURING THE SAME

(75) Inventors: Seong-min Kim; Jin-young Hong; Seok-gyun Chang; Hyo-rang Kang, all of Kyonggi-Do (KR)

(73) Assignee: Ness Capacitor Co., Ltd., Suwon-si (KR)

( * ) Notice: Subject to any disclaimer, the term of this patent is extended or adjusted under 35 U.S.C. 154(b) by 0 days.

(21) Appl. No.: 09/494,308

(22) Filed: Jan. 31, 2000

(51) Int. Cl.$^7$ .............................. H01G 9/02; H01G 4/32; H01M 6/14
(52) U.S. Cl. ...................... 361/512; 361/526; 361/530
(58) Field of Search ............................... 361/502–505, 361/508–512, 516, 525, 526, 527, 528–530

(56) References Cited

U.S. PATENT DOCUMENTS

| | | | | |
|---|---|---|---|---|
| 3,067,367 A | * | 12/1962 | Ross ........................ 317/230 |
| 4,146,916 A | * | 3/1979 | Breeden et al. ............. 361/433 |
| 4,298,906 A | * | 11/1981 | Elias ........................ 361/433 |
| 5,626,729 A | * | 5/1997 | Thompson et al. ......... 204/252 |
| 5,754,394 A | * | 5/1998 | Evans et al. ................ 361/516 |
| 5,909,356 A | * | 6/1999 | Hirabayashi et al. ....... 361/523 |
| 5,982,609 A | * | 11/1999 | Evans ........................ 361/516 |
| 6,058,006 A | * | 5/2000 | Yoshioka et al. ........... 361/511 |
| 6,094,339 A | * | 7/2000 | Evans ........................ 361/516 |

* cited by examiner

*Primary Examiner*—Anthony Dinkins
*Assistant Examiner*—Eric W. Thomas
(74) *Attorney, Agent, or Firm*—Jacobson Holman, PLLC

(57) ABSTRACT

An electric energy storage device includes a first electrode, a gel type ionic conducting polymer electrolyte separator formed on the first electrode, and a second electrode corresponding to the first electrode. The energy storage device has an increased unit storage capacitance and more minimized size by using the gel type ionic conducting polymer electrolyte separator. Also, the energy storage device produces a reduced resistance by the gel type ionic conducting polymer electrolyte separator, such that the high frequency response characteristic is improved, the available frequency region is enlarged and the allowable ripple current is increased. A method for manufacturing the electric energy storage device includes the stops of: forming an ionic conducting polymer electrolyte separator including i) preparing common solvent for an electrolyte and for dissolving polymer and ii) dissolving polymer at least one selected from the group including polymer of polyacrylate series, polyvinylidenefluoride, copolymer of polyvinylidenefluoride and polymer of polyether series in the common solvent.

26 Claims, 4 Drawing Sheets

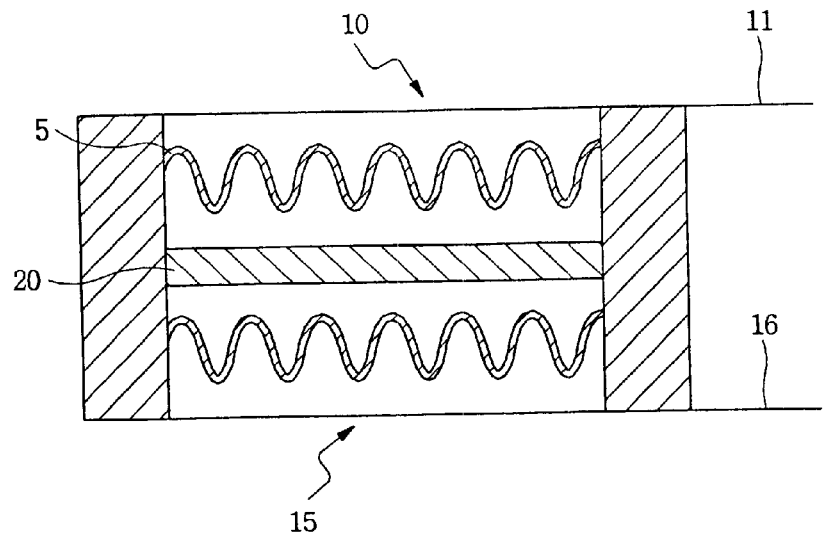
FIG.1 --PRIOR ART--
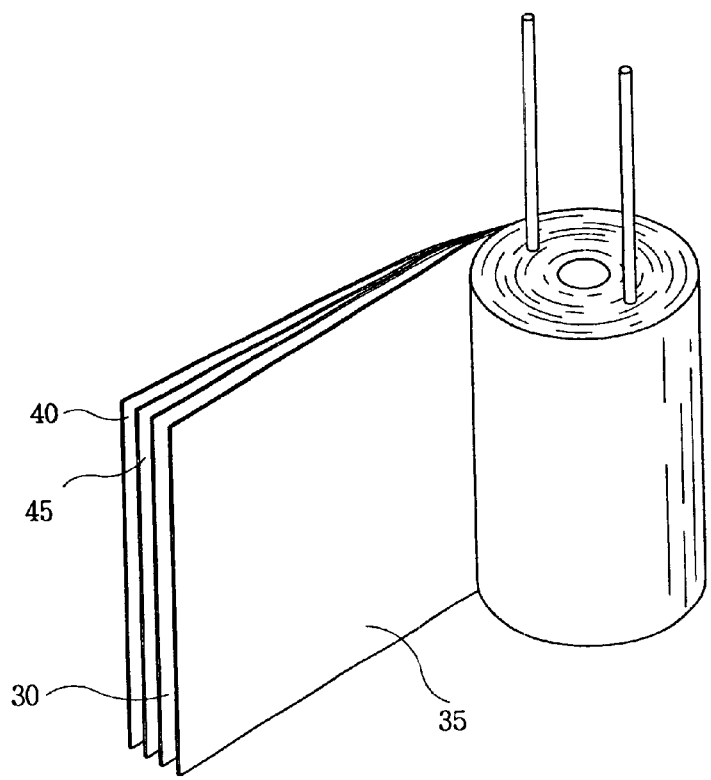
FIG.2 --PRIOR ART--

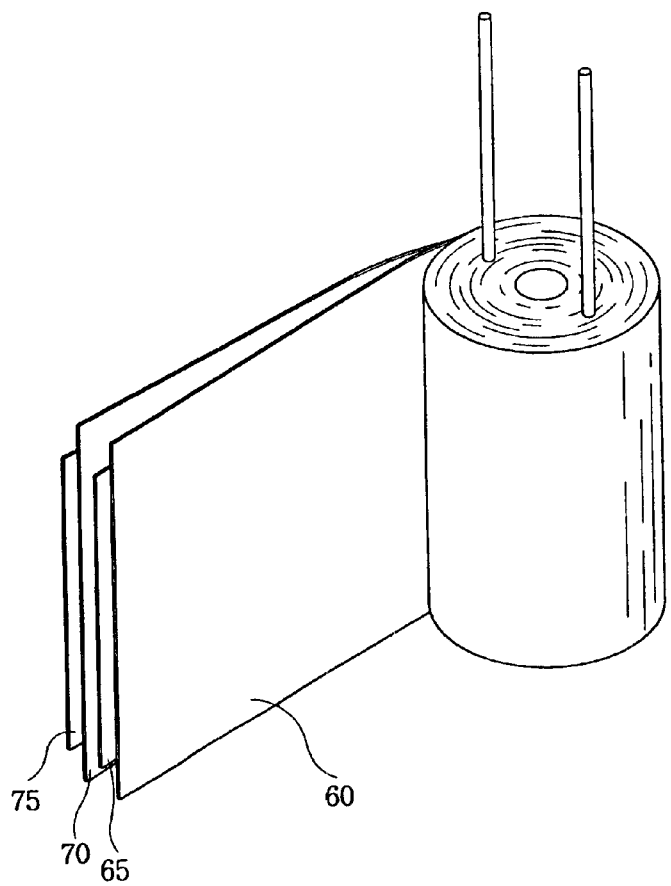
FIG.3 --PRIOR ART--
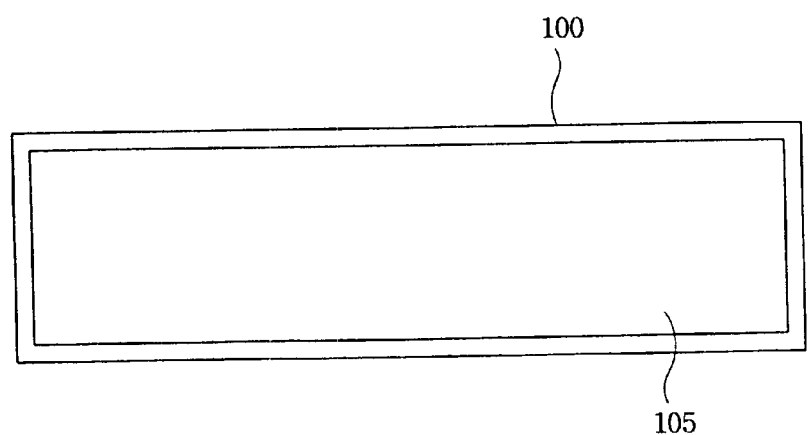
FIG.4

ELECTRIC ENERGY STORAGE DEVICE AND METHOD FOR MANUFACTURING THE SAME

BACKGROUND OF THE INVENTION

1 Field of the Invention

The present invention relates to an electric energy storage device method for manufacturing the same, more particularly, to an electric energy storage device including a gel type ionic conducting polymer electrolyte separator which enhances storage capacitance and reduces resistance, and a manufacturing method thereof.

2 Description of the Related Art

Capacitors are generally classified into three categories: electrostatic capacitors, electrochemical capacitors and electrolytic capacitors. The electrostatic capacitors include a ceramic capacitor, a glass capacitor and a mica capacitor. The storage capacitance of the electrostatic capacitor is between approximately 1.0 $\mu$F and 10 $\mu$F.

The electrochemical capacitors are called supercapacitors. The electrochemical capacitors include an Electric Double Layer Capacitor (EDLC), a metal oxide pseudocapacitor and a conducting polymer capacitor. The storage capacitance of the electrochemical capacitors is between approximately 1 mF and 3,000 F.

Some capacitors such as an aluminum electrolytic capacitor and a tantalum electrolytic capacitor are types of the electrolytic capacitors. The storage capacitance of the electrolytic capacitor is normally hundreds of times larger than that of the electrostatic capacitor.

In general, an electrode of the electrolytic capacitor is made by etching a valve metal, such as aluminum (Al), and by carrying out a chemical process or an electrochemical process. An electrode of the electrolytic capacitor is manufactured by sintering a valve metal powder, such as an aluminum powder or a tantalum powder, to have a large specific surface area. Then, the electrode is immersed in an electrolyte to form the electrolytic capacitor.

FIG. 1 is a cross-sectional view of an electrolytic capacitor according to a related art. Referring to FIG. 1, an electrolytic capacitor of the related art is comprised of a cathode 10 which includes a valve metal and an oxide layer 5, an anode 15 corresponding to the cathode 10, a separator 20 between the cathode 10 and the anode 15, an electrolyte (not shown) injected into the separator 20, terminals 11 and 16 respectively attached to the cathode 10 and the anode 15, and a case for sealing the cathode 10, the anode 15 and the separator 20.

The oxide layer 5 is formed on the valve metal which is formed by etching a foil or sintering a metal powder. The oxide layer 5 is generally composed of an aluminum oxide ($Al_2O_3$) or tantalum oxide ($Ta_2O_5$) made by the electrochemical method.

The separator 20 between the anode 15 and the cathode 10 has an ionic conductivity. It also insulates the anode 15 from the cathode 10. The electrolyte is permeated into the anode 15 and the cathode 10, which stores the charge and provides a conducting medium for the ions.

The electrolytic capacitor is widely applied to various electronic devices because of its large storage capacitance, low resistance and low manufacturing cost. Yet, the size and the resistance of the electrolytic capacitor need to be further reduced given the recent development of various electronic devices such as notebook computers and cellular phones.

Considering the need for reducing resistance and minimizing the size of the electrolytic capacitor, a solid electrolytic capacitor, including an electronic conducting material which is injected into cathode, will likely be in demand. The electronic conducting material is composed of manganese oxide ($MnO_2$), tetracyanoquinodimethane (TCNQ) or polypyrrole (PPY).

However, the electrolytic capacitor of the related art has some disadvantages which are described hereinbelow.

FIG. 2 is a perspective view of an electrolytic capacitor having a cylindrical shape according to a related art. Referring to FIG. 2, the electrolytic capacitor of the related art is comprised of a cathode 35, an anode 45, first and second separators 30 and 40, respectively attached to the cathode 35 and the anode 45. The electrodes 35 and 45 and the separators 30 and 40 are wound together to form the electrolytic capacitor. The resistance or the size of such electrolytic capacitor, however, is not easily reduced through the manufacturing process of the electrolytic capacitor.

An electrolytic capacitor includes either a solid electrolyte such as a tantalum electrolytic capacitor or an aluminum PPY electrolytic capacitor, or a liquid electrolyte. In case of using a solid electrolyte, the capacitor generally consists of an anode, and an electronic conducting electrolyte as cathode and terminals. On the other hand, in case of using a liquid electrolyte, the capacitor consists of an anode, a cathode, a separator and terminals.

As for the electrolytic capacitor including the electronic conducting solid electrolyte, a thin layer of cathode is formed on the anode after the anode has been manufactured by etching a metal foil or sintering the metal powder, followed by the formation of an oxide layer on the etched foil or the sintered powder.

In the electrolytic capacitor including the ionic conducting liquid, the cathode, the separator and the anode are approximately 0.05 mm, 0.05 mm and 0.1 mm thick, respectively. That means that the electrolytic capacitor including the liquid electrolyte is much thicker than the electrolytic capacitor including the solid electrolyte. In addition, a liquid electrolyte of the electrolytic capacitor generally has low ionic conductivity.

Hence, the electrolytic capacitor including the ionic conducting liquid electrolyte has more resistance than that of the electrolytic capacitor including the electronic conducting solid electrolyte, since the thickness of the separator needs to be at least approximately 0.05 mm in order to prevent the separator from being torn and the conductivity of the liquid electrolyte is much lower than that of the electronic conducting solid electrolyte.

SUMMARY OF THE INVENTION

Considering the above-described problems and disadvantages, it is an object of the present invention to provide an electrolytic capacitor including a liquid electrolyte, which has a low resistance and a large storage capacitance, and a manufacturing method thereof It is another object of the present invention to provide a manufacturing method for an electric energy storage device using wound electrodes with a gel type ionic conducting polymer electrolyte separator to increase productivity and yield.

To achieve the above objects, the present invention provides an electrolytic capacitor including an ionic conducting polymer electrolyte separator composed of common solvent and polymer. The common solvent functions as an electrolyte as well as a dissolvent of the polymer. The polymer is composed of at least one selected from the polymer groups of polymer of polyacrylate series, polyvinylidenefluoride (PVdF), copolymer of polyvinylidenefluoride and polymer of polyether series.

According to one example of the present invention, a common solvent is composed of propylene carbonate (PC) including alkylammonium compounds such as tetraethylammoniumtetrafluoroborate ($Et_4NBF_4$) or amide compounds such as tertiary amide. In this case, the polymer is composed of polyacrylonitrile (PAN) and polyvinylidenefluoride, wherein the weight ratio between the polyacrylonitrile and the polyvinylidenefluoride is approximately 1:1 to 5:1. However, the preferred weight ratio between the common solvent and the polymer is approximately 4:1 to 10:1.

In another example of the present invention, the polymer is composed of polymethylmethacrylate (PMMA) and polyacrylonitrile. In this case, the weight ratio between the polymethylmethacrylate and the polyacrylonitrile is approximately 1:1 to 4:1.

According to still another example of the present invention, the common solvent is composed of gamma-butyrolactone (γ-BL) including alkylammonium compounds such as tetraethylammoniumtetrafluoroborate or amide compounds such as tertiary amide. The polymer is composed of polyacrylonitrile and the weight ratio between the common solvent and the polymer is approximately 5:1 to 8:1.

In still another example of the present invention, the common solvent is composed of propylene carbonate and gamma-butyrolactone including alkylammonium compounds, such as tetraethylammoniumtetrafluoroborate or amide compounds, such as tertiary amide. In this case, the amount of the propylene carbonate is more than that of the gamma-butyrolactone and the polymer is composed of polyacrylonitrile and polyvinylidenefluoride or polyethylene oxide.

Also, in order to achieve the above objects of the present invention, the electrolytic capacitor of the present invention further includes a first electrode on which the separator is formed and a second electrode corresponding to the first electrode, wherein the separator, the first electrode and the second electrode are wound together. Preferably, the first electrode is a cathode.

According to one embodiment of the present invention, a first electrode which has a larger width than the second electrode, is longer than the second electrode.

According to another embodiment of the present invention, an isolating member is formed at the end portion of the first electrode or a portion of the second electrode where the end portion of the first electrode is positioned. The isolating member is composed of a tape or a paper.

In addition, the electrolytic capacitor of the present invention has an additional electrolyte which is injected into the first and second electrode. It is identical to the common solvent of the separator or different from the common solvent of the separator, thereby enhancing the performance of the electrolytic capacitor and reducing the manufacturing cost of the electrolytic capacitor.

To achieve the above objects of the present invention, the present invention provides an electric energy storage device having an ionic conducting electrolyte, including a gel type ionic conducting polymer electrolyte separator, a first electrode on which the separator is formed, and a second electrode corresponding to the first electrode, wherein the separator, the first electrode and the second electrode are wound together.

Also, to achieve the above objects of the present invention, the present invention provides a method for manufacturing an electric energy storage device including the steps of: forming an ionic conducting polymer electrolyte separator including i) preparing common solvent for an electrolyte and for dissolving polymer and ii) dissolving the polymer at least one selected from the group consisting of polymer of polyacrylate series, polyvinylidenefluoride, copolymer of polyvinylidenefluoride and polymer of polyether series in the common solvent. The step of forming the separator may further includes a step of heating a mixture of the common solvent and polymer, and a step of coating the mixture on a current collector.

According to the present invention, the electrolytic capacitor has an increased unit storage capacitance with minimized size by using the gel type ionic conducting polymer electrolyte separator. Also, the resistance of the electrolytic capacitor is reduced by using the gel type ionic conducting polymer electrolyte separator. Consequently, the electrolytic capacitor of the present invention enables enhancement of a high frequency response characteristic, enlargement of the available frequency region and increase of the allowable ripple current of the electrolytic capacitor.

BRIEF DESCRIPTION OF THE DRAWINGS

The above objects and other advantages of the present invention will become more apparent by describing in detail the preferred embodiments thereof with reference to the attached drawings which:

FIG. 1 a cross-sectional view of an electrolytic capacitor according to a related art;

FIG. 2 is a perspective view of an electrolytic capacitor having a cylindrical shape according to a related art;

FIG. 3 is a schematic perspective view illustrating the winding of an electrolytic capacitor of the related art;

FIG. 4 is a plain view of an electrolytic capacitor having a gel type ionic conducting polymer electrolyte according to one embodiment of the present invention;

DETAILED DESCRIPTION OF THE INVENTION

Figure 5:
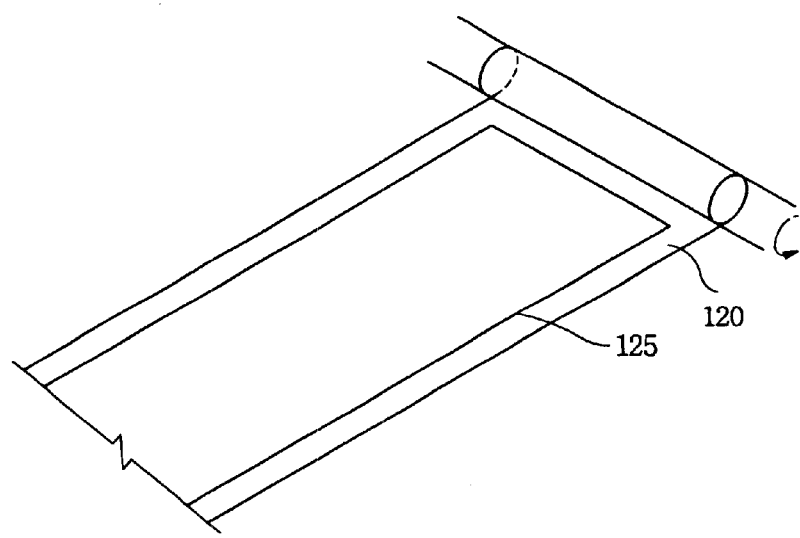
FIG. 5 is a schematic view illustrating a process for winding an anode and a cathode with a gel type ionic conducting polymer electrolyte separator according to another embodiment of the present invention.

Hereinafter, various embodiments of the present invention will be explained in more detail with reference to the accompanying figures. However, it is understood that the present invention should not be limited to the following preferred embodiments set forth herein.

First Embodiment

In order to overcome the problems and disadvantages of a separator used in the conventional electrolytic capacitor including a liquid electrolyte, various examples of the preparation of a gel type ionic conducting polymer electrolyte separator of the present invention are provided as follows:

EXAMPLE 1

Preparation of a gel type ionic conducting polymer electrolyte separator by using propylene carbonate (PC) including tetraethylammoniumtertafluoroborate ($Et_4NBF_4$).

For manufacturing a gel type ionic conducting polymer electrolyte separator, 1 mole(i.e., 7 g) of tetraethylammoniumtertafluoroborate ($Et_4NBF_4$) is dissolved into 32 g of common solvent. In the present example, the common solvent is propylene carbonate (PC) which dissolves the polymer and functions as an electrolyte.

Subsequently, the polymer consisting of 3 g of polyacrylonitrile (PAN) and 1 g of polyvinylidenefluoride (PVDF) is homogeneously dissolved in the common solvent at the room temperature to form a mixture of the common solvent and polymer.

After the mixture is heated at 120° C. for one hour, the mixture is coated on a current collector to form a gel type ionic conducting polymer electrolyte separator. Table 1 shows ionic conductivities of the conventional ionic conducting electrolyte separator and the gel type ionic conducting polymer electrolyte separator according to the present example.

TABLE 1

| separator | composition | manufacturer (country) | thickness ($\mu m$) | ionic conductivity (mS/cm) |
|---|---|---|---|---|
| Celgard3501 | polypropylene | CELGARD U.S. | 25 | 0.59 |
| MER2.5 | pulp | Nippon Kodoshi Corporation (Japan) | 40 | 1.06 |
| CTW5755 | pulp and rayon | Nippon Kodoshi Corporation (Japan) | 55 | 2.02 |
| TF4035 | rayon | Nippon Kodoshi Corporation (Japan) | 35 | 2.63 |
| present example | {(PAN:PVdF) = (3:1)}: ($Et_4NBF_4$/PC) = 1:8 | . | 35 | 4.30 |

As shown in Table 1, the gel type ionic conducting electrolyte separator has an excellent ionic conductivity of about 4.30 mS/cm which is twice higher than the ionic conductivity of the conventional ionic conducting polymer electrolyte separator. When the thickness of the gel type ionic conducting polymer electrolyte separator is reduced to approximately 25 $\mu m$, the ionic conductivity of the gel type ionic conducting polymer electrolyte separator may increase up to 6.02 mS/cm since the ionic conductivity of the electrolytic separator is linearly in inverse proportion to the thickness of the electrolyte separator.

EXAMPLE 2
Preparation of a gel type ionic conducting polymer electrolyte separator by using PC including $Et_4NBF_4$.

In this example, 1 mole (7 g) of $Et_4NBF_4$ is dissolved into 32 g of PC as common solvent which dissolves the polymer and functions as an electrolyte like example 1. Here, the polymer is composed of 1 g of PAN and 2 g of polymethylmethacrylate (PMMA), which belongs to the polymer of polyacrylate series.

After the polymer is homogeneously dissolved in the common solvent at the room temperature to form a mixture of the common solvent and polymer, the mixture is heated at 120° C. for 40 minutes for homogeneous viscosity. Subsequently, the mixture is coated on a current collector to form a gel type ionic conducting polymer electrolyte separator.

When the PMMA and the PAN are dissolved in the PC with $Et_4NBF_4$, the gel type ionic conducting polymer electrolyte separator produced ionic conductivity of 5.0 mS/cm. In other words, the polymer electrolyte separator of the present example having thickness of 35 $\mu m$ shows better ionic conductivity than that of the polymer electrolyte separator of example 1.

EXAMPLE 3
Preparation of a gel type ionic conducting polymer electrolyte separator by using gamma-butyrolactone ($\gamma$-BL) including tertiary amide.

In the present example, gamma-butyrolactone ($\gamma$-BL) including tertiary amide is used as common solvent instead of PC with $Et_4NBF_4$.

After 1 mole(4 g) of tertiary amide is dissolved into 20 g of $\gamma$-BL which functions as the common solvent, the polymer consisting of 4 g of PAN is homogeneously dissolved into $\gamma$-BL to form a mixture of the common solvent and polymer.

After the mixture is heated at 110° C. for one hour, the mixture is coated on a current collector and cooled at the room temperature to form a gel type ionic conducting polymer electrolyte separator having thickness of 35 $\gamma m$.

The gel type ionic conducting polymer electrolyte separator of the present invention has ionic conductivity of 2.74 mS/cm which is lower than that of the separator manufactured by using PC with $Et_4NBF_4$. The gel type ionic conducting polymer electrolyte separator of the present example can be homogeneously mixed with PAN because $\gamma$-BL has a higher affinity with PAN compared to that with PC. Also, the gel type ionic conducting electrolyte separator of the present example has the ionic conductivity lower than that of example 1 or 2 due to the increase of the viscosity of ion conducting medium.

EXAMPLE 4
Preparation of a gel type ionic conducting polymer electrolyte separator by using PC and $\gamma$-BL with $Et_4NBF_4$.

After polypropylene carbonate including $Et_4NBF_4$ and gamma-butyrolactone having $Et_4NBF4$ are mixed by the weight ratio of 1:1, polymer composed of the polyacrylate series and polyether series is dissolved to manufacture a gel type ionic conducting polymer electrolyte separator. In the present example, the polymer is composed of polyacrylonitrile, polyvinylidenefluoride and polyethylene oxide.

When the common solvent is only comprised of the $\gamma$-BL with $Et_4NBF_4$, the ionic conducting polymer electrolyte separator failed to reach a gel state after the mixture of common solvent and polymer was coated on a current collector. Hence, PC is mixed with $\gamma$-BL to form the gel type ionic conducting polymer electrolyte separator.

In the present example, the weight ratio between PAN and PVdF is preferably 1:1 to 5:1 when PC with $Et_4NBF_4$ is mixed with $\gamma$-BL as the common solvent. If the gel type ionic conducting polymer electrolyte separator includes PAN in accordance with such ratio, the ionic conductivity of the gel type ionic conducting polymer electrolyte separator greatly decreases. Also, the mechanical strength of the gel type ionic conducting polymer electrolyte separator decreases, such that an electrolytic capacitor cannot be formed when the gel type ionic conducting polymer electrolyte separator includes a certain quantity of the PAN which fails to meet such ratio.

Although the mixture of common solvent and polymer are mainly described in the above examples, diethylcarbonate (DEC), dimethyl carbonate (DMC), ethymethyl carbonate (EMC) or ammoniumdihydrogenphospate can be also added to the common solvent to enhance low and high temperature characteristics and the ionic conductivity of the electrolytic capacitor, respectively. However, the characteristics and the manufacturing processes of the polymer electrolyte will not be changed by those additives since the characteristics and the manufacturing processes of the gel type ionic conducting polymer electrolyte are determined by the common solvent and polymer.

Second Embodiment

In addition to the examples for preparing the gel type ionic conducting polymer electrolyte separator as set forth above in examples 1–4 of the first embodiment, an additional electrolyte having excellent ionic conductivity is injected into electrodes and a gel type ionic conducting polymer electrolyte separator after the electrodes and the gel type ionic conducting polymer electrolyte separator are wound to form an electrolytic capacitor. Gamma-butyrolactone or acetonitrile ($CH_3CN$) including the above-mentioned solution such as $Et_4NBF_4$ is used as the additional electrolyte.

Regarding the electrolytic capacitor having the gel type ionic conducting polymer electrolyte separator manufactured by the above-described examples, the electrolytic capacitor normally works when the gel type ionic conducting polymer electrolyte separator is sufficiently thick. This is due to the fact that the the gel type ionic conducting polymer electrolyte can permeate into the electrodes and into the interface between the electrodes and the gel type ionic conducting polymer electrolyte separator. If the thickness of the gel type ionic conducting polymer electrolyte separator is insufficient, the operation of the electrolytic capacitor may be limited. Thus, additional electrolytes may be injected to enhance the performance of the electrolytic capacitor. In this case, the additional electrolytes may be identical to the common solvent for manufacturing the gel type ionic conducting electrolyte separator or may be different from the common solvent of the gel type ionic conducting electrolyte separator. If the additional electrolyte differs from the common solvent of the gel type ionic conducting electrolyte separator, the performance of the electrolytic capacitor may improve since the common solvent of the gel type ionic conducting electrolyte separator and the additional electrolyte can act separately.

In one example of the present embodiment, the acetonitrile in which 1 mole of $Et_4NBF_4$ is dissolved is additionally injected into the electrodes and the gel type ionic conducting electrolyte separator, while PC including 1 mole of $Et_4NBF_4$ is used as common solvent during the manufacturing process for the gel type ionic conducting polymer electrolyte separator. Also, γ-BL with $Et_4NBF_4$ is used as an additional electrolyte according to another example of the present embodiment. Furthermore, PC including $Et_4NBF_4$ can be injected as the additional electrolyte, thereby enhancing the performance of the electrolytic capacitor of the present embodiment.

According to the present embodiment, in case that PC including $Et_4NBF_4$ is used as the common solvent and also used as the additional electrolyte which is injected into the electrodes and the gel type ionic conducting electrolyte separator, the electrolytic capacitor has a resistance of 20 mΩ at the resonance frequency of the capacitor. At that time, the electrolytic capacitor has diameter of 10 mm and height of 30 mm.

On the other hand, the resistance of the electrolytic capacitor having the same dimension of the above capacitor is 15 mΩ at the resonance frequency when the acetonitrile including $Et_4NBF_4$ is injected as the additional electrolyte after PC including $Et_4NBF_4$ is used as the common solvent of the gel type ionic conducting polymer electrolyte separator. Therefore, the electrolytic capacitor shows a superior performance when the common solvent and the additional electrolyte are different from each other.

Third Embodiment

In the present embodiment, a method for directly coating the gel type ionic conducting polymer electrolyte separator onto an electrode of an electrolytic capacitor will be described.

It is advantageous to have the gel type ionic conducting polymer electrolyte separator coated on the electrode. In other words, when the gel type ionic conducting polymer electrolyte separator is directly coated on the electrode after the gel type ionic conducting polymer electrolyte separator is prepared, the coating process is simply accomplished in comparison with the conventional process for attaching the separator to the electrode.

In addition, when the gel type ionic conducting polymer electrolyte separator is directly coated on the electrode, the gel type ionic conducting polymer electrolyte forms a film. Thus, the adhesion strength between the gel type ionic conducting polymer electrolyte separator and the electrode greatly increases to enhance the interface adhesion between the gel type ionic conducting polymer electrolyte separator and the electrode. Specifically, when the gel type ionic conducting polymer electrolyte separator is directly formed on a powder type activated carbon which is coated on an electrode, a composite of the gel type ionic conducting polymer electrolyte and the activated carbon is formed since the gel type ionic conducting polymer electrolyte becomes a film after the gel type ionic conducting polymer electrolyte is permeated into pores of the activated carbon. Thus, the interface adhesion between the gel type ionic conducting polymer electrolyte and the electrode can greatly increase and the activated carbon can be solidly attached to the electrode by forming the composite of the gel type ionic conducting polymer electrolyte and activated carbon.

In order to increase the storage capacitance of an electrolytic capacitor having an ionic conducting electrolyte, the etching ratio of a metal of an electrode should be increased since the resistance of the electrode may increase when the etching ratio of the electrode increases. However, the electrolytic capacitor can have a thin electrode having a large capacitance if an electrode includes an activated carbon which is coated on a current collector as a cathode of the electrolytic capacitor. The activated carbon is a porous material which has a specific surface area of approximately 2,000 $m^2/g$. The cathode of the electrolytic capacitor may have a storage capacitance of over 10 $mF/cm^2$ when the activated carbon having thickness of approximately 0.01 mm is coated on the cathode. In light of such problems, the cathode of the related art including the etched metal has a storage capacitance of approximately 0.5 $mF/cm^2$. However, the cathode including the activated carbon can have a storage capacitance twenty times larger than that of the cathode of the related art including the etched metal.

In the present embodiment, the cathode of the electrolytic capacitor is manufactured by coating the activated carbon on the current collector and by directly forming the gel type ionic conducting polymer electrolyte in the pores and on the surface of the activated carbon. Therefore, the electrolytic capacitor can have an excellent storage capacitance and exceedingly enhanced performance because of the thin cathode and greatly increased capacitance. The gel type ionic conducting polymer electrolyte separator also has a superior mechanical strength and high ionic conductivity.

For example, the 6.3 V electrolytic capacitor of the related art has a storage capacitance of about 2.2 to 3.3 mF when the electrolytic capacitor has diameter of 13 mm and height of 20 mm. The electrolytic capacitor of the present invention, however, has a storage capacitance of 5 mF when the electrolytic capacitor of the present invention has the dimension identical as that of the conventional electrolytic capacitor. The electrolytic capacitor of the present embodiment includes a cathode manufactured by directly coating 0.03 mm of the gel type ionic conducting polymer electrolyte separator on a cathode previously manufactured by coating 0.015 mm of an activated carbon on an aluminum foil having thickness of 0.02 mm.

An anode of the electrolytic capacitor has an oxide layer formed thereon. Because the anode having the oxide layer may be damaged during the manufacturing process, the oxide layer is recuperated by applying a predetermined voltage to the electrolytic capacitor for an aging process after the electrolytic capacitor is completed. Gas is generated during the recuperation of the oxide layer. If the gel type ionic conducting polymer electrolyte separator is directly coated on the anode, the storage capacitance of the electrolytic capacitor may reduce and the resistance of the electrolytic capacitor may increase since the gas generated during the aging process is confined between the anode and the gel type ionic conducting polymer electrolyte separator. In order to prevent such problems, it is more advantageous to directly coat the gel type polymer electrolyte separator on the cathode of the electrolytic capacitor.

Fourth Embodiment

In the present embodiment, a method for winding electrodes and separator of an electrolytic capacitor will be described as follows:

FIG. 3 is a schematic perspective view illustrating the winding of an electrolytic capacitor according to the related art.

Referring to FIG. 3, in the electrolytic capacitor of the related art including porous paper or polyproplene as a separator, electrodes 65 and 75 and separators 60 and 70, respectively, are wound together wherein widths of the first and second separators 60 and 70 are respectively wider than those of the anode 65 and the cathode 75 to prevent an electrical short between the anode 65 and the cathode 75.

However, in the present embodiment, the electrode having the gel type ionic conducting polymer electrolyte separator should be wider and longer than the other electrode, respectively, so as to prevent the electrical short between the electrodes of the electrolytic capacitor in case of using the gel type ionic conducting polymer electrolyte separator. That is, the width of the gel type ionic conducting polymer electrolyte separator does not need to be larger than the electrodes as the separators of the related art in FIG. 3.

One of the variations of this embodiment is that a gel type ionic conducting polymer electrolyte film may be attached to the electrode after the gel type ionic conducting polymer electrolyte is coated on a substrate to have a film shape followed by attaching the substrate, which is a separator, on an electrode. However, such manufacturing process demands more cost and excessive processing time.

FIG. 4 is a plain view showing electrodes of the electrolytic capacitor having the gel type ionic conducting polymer electrolyte separator according to one embodiment of the present invention. As shown in FIG. 4, in order to prevent the electrical short between one electrode and the other electrode having the gel type ionic conducting polymer electrolyte separator, width and length of a second electrode 105 are respectively shorter than those of a first electrode 100. The gel type ionic conducting polymer electrolyte separator is coated on the first electrode 100.

As mentioned above in the third embodiment, the gel type ionic conducting polymer electrolyte separator is preferably coated on the cathode of the electrolytic capacitor. Stated differently, it is advantageous to coat the gel type ionic conducting polymer electrolyte separator on the cathode, which has wider width and longer length that those of the anode.

FIG. 5 is a schematic view illustrating a process for winding the anode and the cathode with the gel type ionic conducting polymer electrolyte separator according to a preferred example.

The electrical short between the electrodes may occur when the end portion of the electrode having the gel type ionic conducting polymer electrolyte separator is located at the end portion of the other electrode during the process of winding the electrodes.

Referring to FIG. 5, a first electrode 120 having the gel type ionic conducting polymer electrolyte separator is previously wound by at least half a revolution, and then the first electrode 120 is wound with a second electrode 125. The first electrode 120 is longer than the second electrode 125 at the winding starting position. Simultaneously, the first electrode 120 is also longer than the second electrode 125 at the ending position. The cathode is initially wound by at least half a revolution, and then the cathode and the anode are wound together. Also, the cathode is further wound by at least half a revolution after the winding of the anode is completed.

Figure 6:
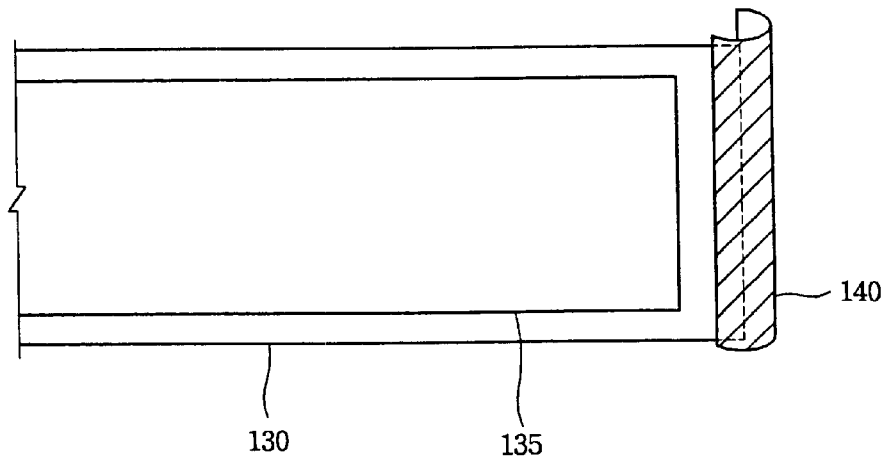
FIG. 6 is a schematic view illustrating a process for winding an anode and a cathode having a gel type ionic conducting polymer electrolyte separator according to still another embodiment of the present invention.

FIG. 6 is a schematic view illustrating the process for winding the anode and cathode having the gel type ionic conducting polymer electrolyte separator according to another preferred example. As shown in FIG. 6, in order to prevent the electrical short between first and second electrodes 130 and 135 at the winding position, the end portion of the first electrode 130 is covered with an insulating member 140. The gel type ionic conducting polymer electrolyte separator is formed on the first electrode 130. The insulating member 140 can be a paper, a tape or other insulating materials. Also, the insulating member 140 can be formed on a portion of the second electrode 135 where the end portion of the first electrode 130 is positioned to prevent the electrical short between the electrodes 130 and 135.

When the electrodes 130 and 135 are wound with the insulating member 140, the short between the electrodes 130 and 135 cannot occur even though the end portion of the first electrode 130 is located at the end portion of the second electrode 135.

Meanwhile, in case where the gel type ionic conducting polymer electrolyte separator is used, the electrolytic capacitor can introduce various shapes, such as a square pillar, a rectangular pillar, a triangular pillar or a pentagonal pillar along with a cylindrical shape, because the gel type polymer electrolyte separator is directly coated on the electrode of the electrolytic capacitor.

Figure 7:
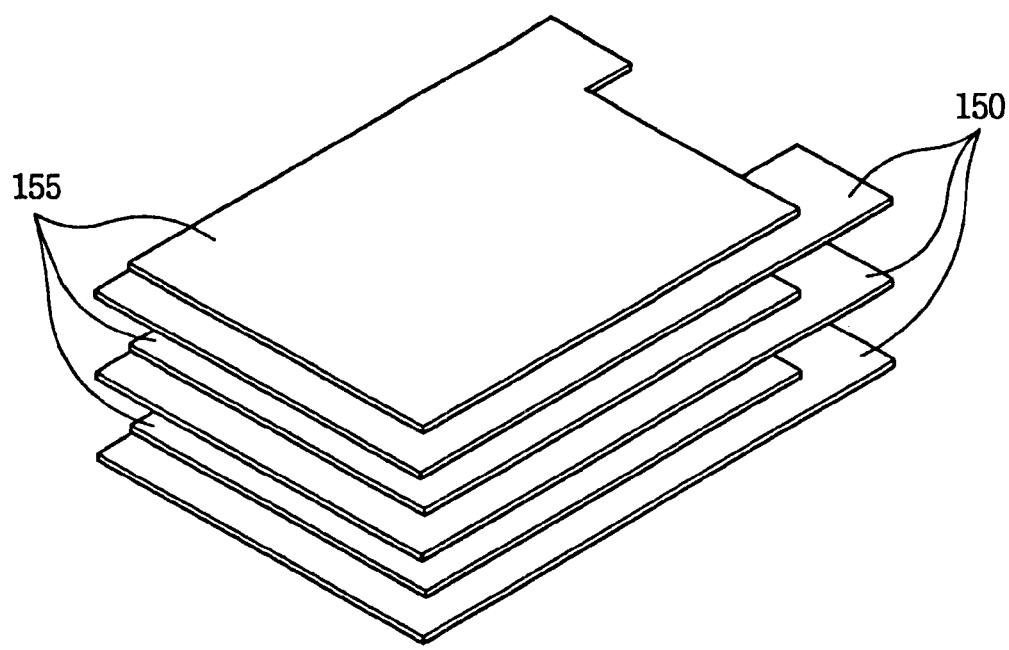
FIG. 7 is a schematic perspective view of a multi layer type electrolytic capacitor according to the present invention.

FIG. 7 is a schematic perspective view showing a multi layer type electrolytic capacitor according to the present invention. Referring to FIG. 7, when the electrolytic capacitor is a multi layer type, the gel type ionic conducting polymer electrolyte separators formed on first electrodes 150 also work as bonding agents between first electrodes 150 and second electrodes 155, thereby easily accomplishing the process of stacking the electrodes 150 and 155, alternately.

According to the present invention, the unit storage capacitance of the electrolytic capacitor can be greatly increased but the size of the electrolytic capacitor is decreased by using the gel type ionic conducting polymer electrolyte separator. Also, the electrolytic capacitor reduces the resistance by the gel type ionic conducting polymer electrolyte separator so that the electrolytic capacitor enables enhancement of high frequency response characteristic, enlargement of the available frequency region of the capacitor and increase of the allowable ripple current of the capacitor.

Although the preferred embodiments of the invention have been described, it is understood that the present invention should not be limited to those preferred embodiments, but various changes and modifications can be made by one skilled in the art within the spirit and scope of the invention as hereinafter claimed.

What is claimed is:

1. An electrolytic capacitor comprising:
    a first electrode;
    a second electrode corresponding to said first electrode;
    an ionic conducting polymer electrolyte separator for electrically separating said first and second electrodes, said separator comprising at least one polymer selected from the group consisting of a polyacrylate, a polyvinylidenefluoride (PVdF), a copolymer of polyvinylidenefluoride and a polyether, and an electrolyte which is a common solvent for the at least one polymer;
    first and second terminals respectively attached to said first and second electrodes; and
    an additional electrolyte injected in said first electrode and said second electrode.

2. The electrolytic capacitor as claimed in claim 1, wherein said common solvent comprises propylene carbonate (PC).

3. The electrolytic capacitor as claimed in claim 2, wherein said common solvent comprises tetraethylammoniumtetrafluoroborate ($Et_4NBF_4$) or tertiary amide.

4. The electrolytic capacitor as claimed in claim 2, wherein said at least one polymer comprises polyacrylonitrile (PAN) and polyvinylidenefluoride.

5. The electrolytic capacitor as claimed in claim 4, wherein a weight ratio between the polyacrylonitrile and the polyvinylidenefluoride is approximately 1:1 to 5:1.

6. The electrolytic capacitor as claimed in claim 4, wherein a weight ratio between said common solvent and said at least one polymer is approximately 4:1 to 10:1.

7. The electrolytic capacitor as claimed in claim 2, wherein said at least one polymer comprises polymethylmethacrylate (PMMA) and polyacrylonitrile.

8. The electrolytic capacitor as claimed in claim 7, wherein a weight ratio between the polymethylmethacrylate and the polyacrylonitrile is approximately 1:1 to 4:1.

9. The electrolytic capacitor as claimed in claim 2, wherein said common solvent comprises an alkylammonium compound or an amide.

10. The electrolytic capacitor as claimed in claim 1, wherein said common solvent comprises gamma-butyrolactone (γ-BL).

11. The electrolytic capacitor as claimed in claim 10, wherein said common solvent comprises tetraethylammoniumtetrafluoroborate ($Et_4NBF_4$) tertiary amide.

12. The electrolytic capacitor as claimed in claim 10, wherein said at least one polymer comprises polyacrylonitrile.

13. The electrolytic capacitor as claimed in claim 12, wherein a weight ratio between said common solvent and said at least one polymer is approximately 5:1 to 8:1.

14. The electrolytic capacitor as claimed in claim 10, wherein said common solvent comprises alkylammonium compound or an amide.

15. The electrolytic capacitor as claimed in claim 1, wherein said common solvent comprise propylene carbonate and gamma-butyrolactone.

16. The electrolytic capacitor as claimed in claim 15, wherein said common solvent comprises tetraethylammoniumtetrafluorobrate ($Et_4NBF_4$) or tertiary amide.

17. The electrolytic capacitor as claimed in claim 16, wherein an amount of the propylene carbonate is more than that of the gamma-butyrolactone.

18. The electrolytic capacitor as claimed in claim 15, wherein said at least one polymer comprises polyacrylonitrile and polyvinylidenefluoride or polyethylene oxide.

19. The electrolytic capacitor as claimed in claim 15, wherein said common solvent comprises an alkylammonium compound or an amide.

20. The electrolytic capacitor as claimed in claim 1, wherein said separator is formed on said first electrode, and said separator, said first electrode and said second electrode are wound together.

21. The electrolytic capacitor as claimed in claim 20, wherein said first electrode is a cathode.

22. The electrolytic capacitor as claimed in claim 21, wherein an activated carbon is coated on said first electrode.

23. The electrolytic capacitor as claimed in claim 20, wherein said first electrode is longer and wider than said second electrode.

24. The electrolytic capacitor as claimed in claim 20, said electrolytic capacitor further comprising an isolating means formed on an end portion of said first electrode or a portion of said second electrode where an end portion of said first electrode is positioned.

25. The electrolytic capacitor as claimed in claim 24, wherein the isolating means is tape or paper.

26. The electrolytic capacitor as claimed in claim 1, wherein said addition electrolyte is identical to the common solvent of said separator or different from the common solvent of said separator.

* * * * *